United States Patent [19]

MacChesney et al.

[11] 4,217,027
[45] Aug. 12, 1980

[54] OPTICAL FIBER FABRICATION AND RESULTING PRODUCT

[75] Inventors: John B. MacChesney, Stirling; Paul B. O'Connor, Plainfield, both of N.J.

[73] Assignee: Bell Telephone Laboratories, Incorporated, Murray Hill, N.J.

[21] Appl. No.: 828,617

[22] Filed: Aug. 29, 1977

Related U.S. Application Data

[63] Continuation of Ser. No. 444,705, Feb. 22, 1974, abandoned.

[51] Int. Cl.³ ............... C03B 37/07; C03B 37/075
[52] U.S. Cl. .................................. 350/96.3; 65/3 A; 65/18; 427/163; 427/167; 427/231; 427/237; 350/96.31
[58] Field of Search ............ 65/3 A, DIG. 7, 2, 18; 427/163, 167, 231, 237; 350/96.3, 96.31

[56] References Cited

U.S. PATENT DOCUMENTS

| | | | |
|---|---|---|---|
| 3,711,262 | 1/1973 | Keck et al. | 65/DIG. 7 |
| 3,737,292 | 6/1973 | Keck et al. | 65/3 A |
| 3,737,293 | 6/1973 | Maurer | 65/3 A |
| 3,823,995 | 7/1974 | Carpenter | 350/96.31 |
| 3,826,560 | 7/1974 | Schultz | 350/96.31 |
| 3,843,229 | 10/1974 | Rosenberger | 350/96.31 |
| 3,884,550 | 5/1975 | Maurer et al. | 65/DIG. 7 |
| 3,961,926 | 6/1976 | Asam | 65/DIG. 7 |

FOREIGN PATENT DOCUMENTS

| | | |
|---|---|---|
| 585567 | 10/1959 | Canada . |
| 716516 | 8/1965 | Canada . |
| 2328930 | 1/1974 | Fed. Rep. of Germany . |
| 2434717 | 3/1975 | Fed. Rep. of Germany . |

OTHER PUBLICATIONS

Powell et al., *Vapor Deposition*, John Wiley and Sons, Inc., New York, 1966: pp. 11, 12; 149-153; 259-263; and 391-397.

Steinmaier et al., "Successive Growth of Si and $SiO_2$ in Epitaxial Apparatus", J. El. Soc., vol. 111, 1964, pp. 206-209.

Kern et al., "Chemical Vapor Deposition of Silicate Glasses . . . ", J. El. Soc., vol. 117, 1970, pp. 562-568.

MacChesney et al., Preparation of Low Loss Optical Fibers Using Simultaneous Vapor Phase Deposition and Fusion", Tenth Int. Congress on Glass, pp. 6-40 to 6-45, Jul. 1974.

*Primary Examiner*—Richard V. Fisher
*Attorney, Agent, or Firm*—George S. Indig; Samuel H. Dworetsky

[57] ABSTRACT

A preform for fabrication of a glass fiber optical transmission line is prepared by chemical reaction of vapor ingredients within a glass tube. Reaction, which may be between chlorides or hydrides of, for example, silicon and germanium with oxygen, occurs preferentially within a constantly traversing hot zone. Flow rates and temperature are sufficient to result in glass formation in the form of particulate matter on the inner surface of the tube. This particulate matter deposits on the tube and is fused with each passage of the hot zone. Continuous rotation of the tube during processing permits attainment of higher temperatures within the heated zone without distortion of the tube.

26 Claims, 4 Drawing Figures

OPTICAL FIBER FABRICATION AND RESULTING PRODUCT

This is a continuation of application Ser. No. 444,705, filed Feb. 22, 1974, now abandoned.

BACKGROUND OF THE INVENTION

1. Field of the Invention

The invention is concerned with fibers for use as transmission lines in communications systems operating in the visible or near visible spectra. Such fibers are generally clad for guiding purposes so that refractive index decreases in value from the core center to the periphery either as a step function or as a continuous gradient.

2. Description of the Prior art

"Optical" communications systems, that is systems operating in the visible or near visible spectra, are now at an advanced stage of development. In accordance with the view held by many, commercial use may be expected within a period of about five years.

A system most likely to find initial, and probably long term, use utilizes clad glass fibers as the transmission medium. These fibers, generally having an overall cross-sectional diameter of about 100 $\mu$m, are generally composed of at least two sections: core and cladding. The cladding layer is necessarily of lowered refractive index relative to the core with typical index variation from core to clad being in the range from about 0.01 to 0.05. Structures under study may be single mode or multimode. The former is characterized by a sufficiently small core section to efficiently accommodate only the first order mode. Such structures may have a core about 1 or 2 $\mu$m. Multimode lines typically have core sections from 50 $\mu$m to 85 or 90 $\mu$m in diameter.

Multimode structures appear to be of somewhat greater interest at this time. The greater core section facilitates splicing and permits more efficient energy coupling to source and repeater. Introduction of many modes into or, alternatively, generation of many modes within the line does give rise to a dispersion limitation which takes the form of a smearing due to the differing velocities of different order modes. Mode dispersion effects have been minimized by a continuous focusing structure. This structure takes the form of a fiber, the index of which is graded generally exponentially from a high value at the core center. The fundamental mode which traverses the length of material is generally confined to the highest index (lowest velocity) region, while higher order modes as path length increases spend longer and longer periods in relatively low index (high velocity) regions.

A number of procedures have been utilized for fabricating clad glass fibers. Most have yielded to procedures which in some way involve vapor source material. So, typically, chlorides, hydrides, or other compounds of silica, as well as desired dopants, tailoring the index, are reacted with oxygen to produce deposits which directly or ultimately serve as glass source material from which the fiber is drawn. Dopant materials include compounds of, for example, boron for lowering index and germanium, titanium, aluminum, and phosphorus for increasing index. Where the ultimate product is to be a graded multimode line, index gradation may be accomplished, for example, by altering the amount or type of dopant during deposition.

One procedure utilizing vapor source material is chemical vapor deposition (CVD). In this procedure, compounds are passed over a heated surface—e.g., about a rod or within a tube. Temperatures and rates are adjusted so that reaction is solely heterogeneous, i.e., occurs at the heated surface so that the initial material is a continuous glass layer.

An alternative procedure results in the introduction of such precursor materials into a flame produced by ignition of a gaseous mixture of, for example, methane and oxygen. Reaction is, in this instance, homogeneous resulting in formation of glassy particles within the flame. Combustion product and glassy particles then form a moving gas stream which is made incident again on a heated surface, such as a rod or tube. Adherent particles sometimes called "soot" are in subsequent processing flushed, and are sintered and fused to result in a glassy layer.

The CVD process has advantages including high purity but suffers from prolonged required deposition periods. Typically, a suitable preform adequate for fabrication of a kilometer of fiber may require periods of a day or longer.

The soot process has the advantage of high speed; preforms adequate for fabrication of a kilometer of fiber may be prepared in a few hours or less. Disadvantages, however, include at least initial introduction of contaminants, such as solid carbonaceous residue. Since formation takes place within the combustion environment, hydration is inevitable; and this gives rise to the well-known water absorption peaks with their related subharmonics so consequential in various portions of the infrared spectrum.

Both procedures are now an established part of the art. See, for example, U.S. Pat. Nos. 3,711,262, 3,737,292, and 3,737,293. Modifications in the processes have, to some extent, increased the speed of the CVD process and reduced the effects of contamination by hydration in the soot process. Fibers a kilometer or more in length with losses as low as 2 or 3 dB/kilometer in selected regions of the infrared are now regularly produced in pilot operations.

SUMMARY OF THE INVENTION

The invention provides for fabrication of clad glass fibers by a procedure which combines some of the advantages of the prior art CVD and soot processes. Generally, gas phase precursor reactants together with oxygen are introduced into a glass tube in the form of a constantly moving stream. Tube and contents are heated to homogeneous reaction temperature within a moving hot zone produced by a moving heating means constantly traversing the outside surface of the tube. Homogeneously produced glass particles ("soot") collect on the tube walls, and are fused into a continuous layer within the moving hot zone.

With usual heating means there is simultaneous heterogeneous reaction so that a glassy layer is produced within the moving hot zone by reaction at the heated wall surface. This deposit, which is present under ordinary circumstances, is identical to the layer produced in the normal CVD processing.

In accordance with the preferred embodiment, the tube within which formation is taking place is continuously rotated about its own axis. For example, at a speed of 100 rpm, uniformity about the periphery is enhanced. The surface produced by the molten CVD layer may help to hold the "soot" particles during fusion.

Reactant materials include chlorides and hydrides, as well as other compound which will react with oxygen as described. As in other vapor reaction processes, other gaseous material may be introduced, for example, to act as carrier or, in the instance of extremely combustible matter such as hydrides, to act as a diluent.

Continuous fusion within the hot zone and the resultant thickness uniformity of deposit facilitates formation of graded index structures. As in CVD, gradients may be produced by varying reactant composition with the ratio of high index-producing dopant increasing, in this instance, with successive hot zone traversals. Since reaction conditions for different constituents in the reactant mix are different, it is possible also to produce a gradient by altering temperature and/or flow rate during processing.

Typical reaction temperatures maintained at least at the tube wall are within the range of from 1200 to 1600 degrees C. These temperatures, high relative to CVD, are responsible for rapidity of preform production. Particularly at the high temperature end of the range, distortion of the usually silica tube is avoided by rotation. Narrow zones, increased rotation speed, and vertical disposition of the tube may all contribute to the avoidance of tube distortion.

Preforms adequate for preparation of one or a few kilometers of fiber may be prepared during deposition periods of one or a few hours. These preforms are prepared by conventional processing from the deposited product to a final configuration which, as presently practiced, may be of rod shape with an internal diameter of from 4 to 8 mm and a length of 18 inches. In usual processing, the tube which served as the deposition substrate becomes the clad. It may, in accordance with the system, be composed of pure silica or of silica which has been doped to alter, generally to reduce its index. Variations may include removal of the tube, as well as deposition of additional material on the outer surface. The tube serving as the substrate during deposition may be retained to serve as a clad, may be removed, or may, during simultaneous deposition, on its outer surface be provided with encompassing layer/s.

DETAILED DESCRIPTION

1. The Drawing

Figure 1:
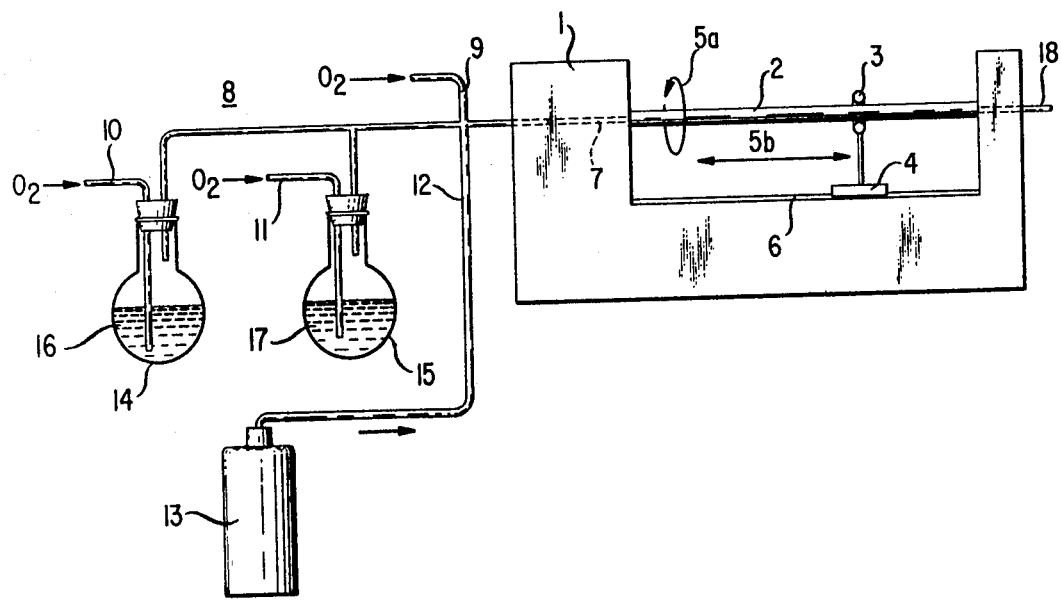
FIG. 1 is a front elevational view of apparatus suitable for practice of the deposition process in accordance with the invention.

FIG. 1 depicts a lathe 1 holding substrate tube 2 within which a hot zone 3 is produced by heating means 4. Tube 2 may be rotated, for example, in the direction shown by arrow 5a by means not shown and hot zone 3 is caused to traverse tube 2 by movement of heating means 4 as schematically depicted by double headed arrow 5b, for example, by a threaded feed member 6. A gaseous material is introduced into tube 2 via inlet tube 7 which is, in turn, connected to source material reservoirs 8. Such reservoirs may include an oxygen inlet 9 connected to means not shown. As depicted, gaseous material may also be introduced by inlets 10 and 11 by means not shown and through inlet 12 from reservoir 13. Reservoirs 14 and 15 contain normally liquid reactant material which is introduced into tube 2 by means of carrier gas introduced through inlets 10 and 11 with the arrangement being such that the carrier gas is bubbled through such liquids 16 and 17. Exiting material is exhausted through outlet 18. Not shown is the arrangement of mixing valves and shut off valves which may be utilized to meter flows and to make other necessary adjustments in composition. The apparatus of FIG. 1 is generally horizontally disposed.

Figure 2:
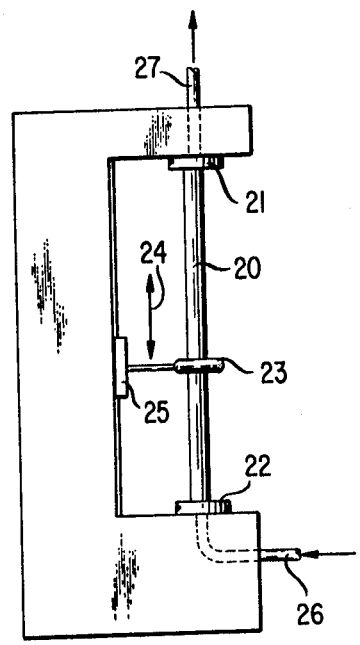
FIG. 2 is a front elevational view of apparatus alternative to that of FIG. 1.

The apparatus of FIG. 2 is, in its operational characteristic, quite similar to that of FIG. 1. Vertical disposition of the substrate tube, however, lends stability to the portion of the tube within the hot zone and may permit attainment of higher temperature or of longer hot zones in the traversal direction without objectionable distortion. Apparatus depicted includes tube 20 which may optionally be provided with rotation means not shown. This tube is secured to the apparatus by means of chucks 21 and 22 and a traversing hot zone is produced within tube 20 by means of a ring burner 23 which is caused to constantly traverse tube 20 in the direction depicted by double headed arrow 24 by moving means 25. Gaseous material, for example, from source such as 8 of FIG. 1 is introduced via inlet tube 26 and exiting material leaves via exhaust 27.

Figure 3:
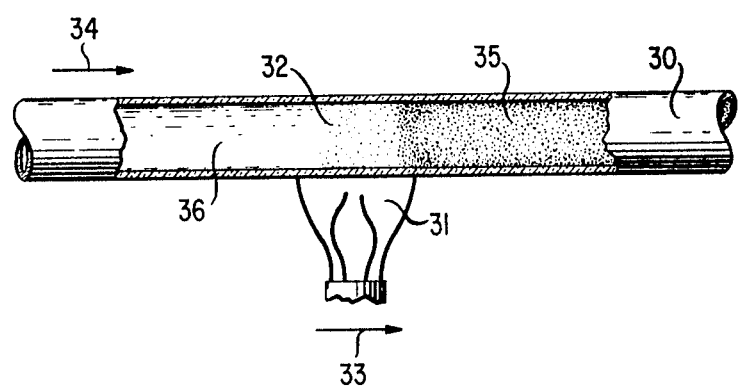
FIG. 3 is a front elevational view of a section of tubular material depicting observed conditions during processing.

FIG. 3 is a front elevational view of a section of a substrate tube 30 as observed during deposition. Depicted is a heating means 31 producing a hot zone 32 which is traversing tube 30 in the direction shown by arrow 33 by means not shown. Gaseous material is introduced at the left end of tube 30 and flows in the broken section of the Figure in the direction shown by arrow 34. For the processing conditions, which with respect to traversal direction and hot zone temperature are those of Example 1, two regions are clearly observable. Zone 35 downstream of hot zone 32 is filled with a moving powdery suspension of particulate oxidic material, while region 36, devoid of such particulate matter, defines the region within which fusion of deposited material is occurring.

Figure 4:
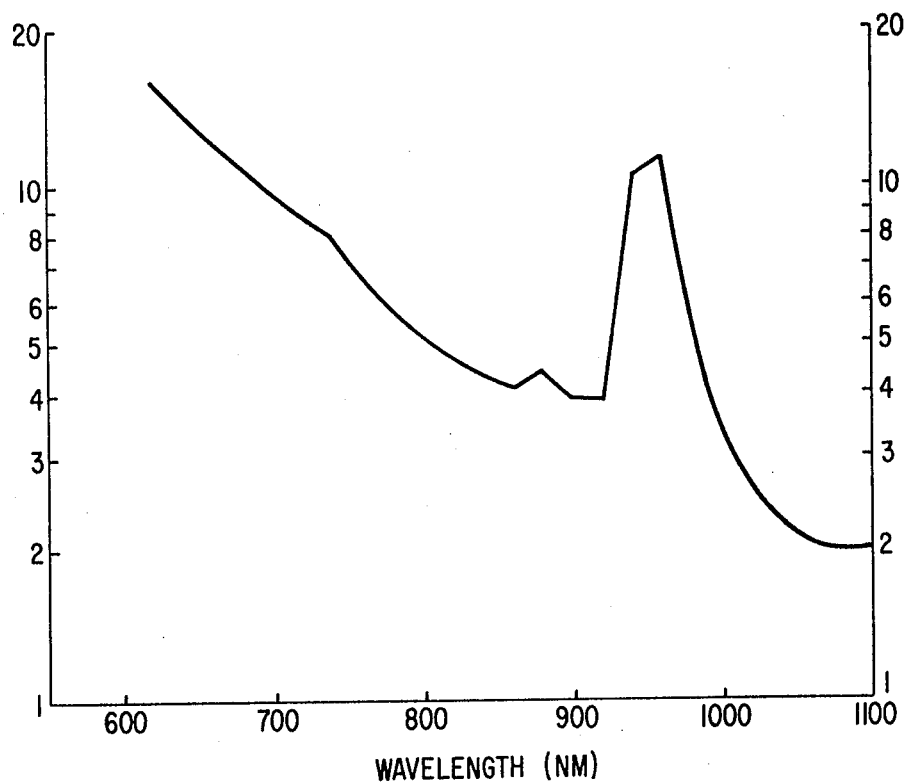
FIG. 4, on coordinates of insertion loss in units of dB/kilometer and wavelength in nanometers, is a plot showing the relationship of those two parameters for a clad multimode fiber produced in accordance with the invention.

FIG. 4 is a plot for measured loss in units of dB/kilometer as measured on 713 meters of fiber prepared in accordance with an Example herein. Abscissa units are wavelength in nanometers. It is seen that loss is at a minimum of about 2 dB/kilometer for the wavelength range of about 1060 to 1100 nm (the limiting value on the plot). The peak at about 950 nm, as well as those at 880 and 730 nm, are characteristic sub-harmonics of the fundamental water absorption.

2. Processing Requirements a. Reaction Temperature

Superficially, the inventive technique resembles conventional chemical vapor deposition. However, whereas CVD conditions are so arranged that deposition is solely the result of heterogeneous formation at a heated substrate surface, procedures of this invention rely upon significant homogeneous reaction. In general, 50 percent or more of reaction product is produced in a position removed from substrate surface and results in the formation of solid oxidic particles of the desired glass composition. These particles are similar to those produced during the "soot" process.

Homogeneous reaction is the result of sufficient rate of reactant introduction and sufficient reaction temperature. Such conditions may be achieved simply by increasing one or both parameters until homogeneous reaction is visually observed. To optimize the process from the standpoint of reaction, high temperatures are utilized. For the usual silica based systems which comprise the preferred embodiment, temperatures at least at the substrate wall are generally maintained at a minimum of 1200 degrees C. at the moving position corresponding with the hot zone. Maximum temperatures are ultimately limited by significant wall distortion. For horizontally disposed apparatus, such as that shown in FIG. 1, in which a hot zone of the length of approximately 2 cm moves at the rate of about 45 cm/min within a tube rotated at the rate of about 100 rpm, a temperature of 1600 degrees C. may be produced without harmful tube distortion. Decreasing the length of the hot zone, increasing the rate of rotation, increasing reactant flow rate, vertical disposition of the tube, are all factors which may permit use of higher maximum temperatures without variation in tube geometry. Indicated temperatures are those measured by means of an optical pyrometer focused at the outer tube surface. It has been estimated that for typical conditions the thermal gradient across the tube may be as high as 300 degrees C.

b. Flow Rates

This parameter, like temperature, is dependent upon other processing conditions. Again, a minimum acceptable rate for these purposes may be determined by visual observation. Highest flow rates are for those materials which by virtue of combustibility, high vapor pressure, etc., are diluted to a significant extent by inert material. Examples are the hydrides where dilution frequently is as high as 99.5 volume percent based on the total reactant content may necessitate a linear flow of at least 1 meter per second. Chlorides, which do not present this problem, need not be diluted to avoid combustion. Inert material, such as nitrogen or helium, is introduced solely for transfer purposes and need be present only in amount typically of up to 10 percent by volume. Flow rates are, as indicated, temperature dependent, with the required homogeneous reaction taking place at acceptable rate only by an increase flow of about 50 percent for each hundred degree increase in reaction temperature.

c. Reactants

Examples were carried out using chlorides and hydrides. Other gaseous materials of sufficient vapor pressure under processing conditions which react with oxygen or oxygen bearing material to produce the required oxidic glass may be substituted. In a typical system, the substrate tube is silica—generally undoped. Where this tube is of ordinary purity, first reactant introduced may be such as to result in the formation of a first layer of undoped silica or doped with an oxide such as $B_2O_3$ which serves to lower the refractive index, which acts as a part of the clad and presents a barrier to diffusing impurity from the tube. It may be considered that, under these circumstances, the substrate tube ultimately serves as a mechanical support rather than as an optical cladding. Subsequent to formation of this first barrier layer or absent such procedure, where the tube is of sufficient purity, reactant materials of such nature as to result in the desired index-increased core are introduced. In a chloride system, these may take the form of a mixture of $SiCl_4$ together with, for example $GeCl_4$, and oxygen. Chlorides of other index increasing materials, such as phosphorus, titanium, and aluminum may be substituted for $GeCl_4$ or admixed. $BCl_3$ may also be included perhaps to facilitate glass formation because of lowered fusion temperature; or because of refractive index lowering, the initial mixture may be altered during successive hot zone traversals so as to increase index (by increasing $GeCl_4$ or other index-increasing dopant precursor or by decreasing $BCl_3$).

Since the usual vapor phase glass precursor compounds are not oxidic, oxygen or a suitable oxygen bearing compound is generally included to form the ultimate oxidic glass. A satisfactory procedure, followed in exemplary procedures, takes the form of an oxygen stream bubbled through reservoirs of liquid phase glass forming compounds. In one procedure, for example, oxygen streams were bubbled through silicon tetrachloride, and through germanium tetrachloride. These streams were then combined with vapor phase boron trichloride and additional oxygen, the resultant mixture being introduced into the reaction chamber.

Relative amounts of glass forming ingredients are dependent upon a variety of factors, such as vapor pressure, temperature, flow rate, desired index, etc. The appended examples indicate suitable amounts for producing the noted indices under the noted conditions. Variants are known to those familiar with glass forming procedures.

A variety of diluent materials may be utilized for any of the noted reasons so, for example, argon, nitrogen, helium, etc., may serve to maintain desired flow rates to prevent precombustion, etc. Oxygen bearing compounds which may replace oxygen in whole or in part include $N_2O$, $NO$, and $CO_2$.

In general, concentration of 3d-transition metal impurities in the gas stream is kept below $10^{-2}$ percent, although further reduction in loss accompanies reduction of those impurities down to the part per billion range. Such levels are readily available from commercial sources or by purification by means similar to those taught by H. C. Theuerer, U.S. Pat. No. 3,071,444. As compared with the usual soot process, the inventive procedure is carried out in a controlled environment without direct exposure to combustion products. This inherently results in avoidance of inclusion of particulate combustion products. Where desired, hydration resulting from combustion in the soot process may be minimized. This is a particularly significant advantage for operation in several portions of the infrared spectrum which suffers from sub-harmonics of the fundamental $H_2O$ absorption. Water vapor may, therefore, be a particularly significant impurity and, for many purposes, should be kept to a level below a few ppm by volume.

3. General Procedure

The procedure described is that which was followed in Examples 1 through 4. Deposition was carried out within a 12 I.D. by 14 O.D. mm silica tube. The tube was placed on a glass lathe within which it was rotated at 100 rpm. Before introduction of reactants, it was flushed with a continuous stream of oxygen while traversing with an oxyhydrogen burner sufficient to bring the wall temperature to 1400 degrees C. The purpose was to remove any volatile impurities on the inside wall of the tube.

Following a period of 5 minutes, a mixture of oxygen, $SiCl_4$, and $BCl_3$ replaced the oxygen flow. The composition of approximately 10 percent $SiCl_4$, 3 percent $BCl_3$, remainder oxygen, maintaining temperature at 1400 degrees C. within the moving hot zone as measured at the wall. In this particular example, the zone was moved at a speed of approximately 45 cm/min in the forward direction (direction of gas flow) and was rapidly returned to its initial position (approximately 30 sec. elapsed time to the beginning of the slow traversal).

Formation of flaky material within the tube, at a position spaced from the wall generally downstream of the hot zone, was visually observed. It was deduced and verified that homogeneous reaction was largely within the zone with particulates being carried downstream by the moving gas. Deposition was continued for approximately twenty minutes following which flow of chloride reactants was discontinued. Oxygen flow was continued for several passes of the hot zone.

The procedure to this point results in deposition of a layer serving as cladding. Core material was next deposited by introduction of $SiCl_4$ and $GeCl_4$. These reactants, too, were introduced with an oxygen carrier, as before. With the temperature of the hot zone increased somewhat to about 1450 degrees C., deposition was continued for about one hour.

In this particular example, tube collapse was initiated with reactants still flowing simply by reducing the rate of traverse of the hot zone. This resulted in a temperature increase which ultimately attained a level of about 1900 degrees C. to produce nearly complete collapse. Reactant flow was then stopped with final collapse producing a finished preform consisting of a $GeO_2$-$SiO_2$ core with a borosilicate cladding supported, in turn, by a silica layer. It will be recognized by those skilled in the art of fiber drawing, that the tube, without first being collapsed, can also be drawn into acceptable fiber. The resulting preform was then drawn to result in a fiber having an overall diameter of approximately 100 $\mu m$ with a core area defined as the region within the borosilicate layer having a diameter of approximately 37 $\mu m$. The length of fiber drawn was approximately 0.7 km. The method described in some detail in N. S. Kapany, *Fiber Optics Principles and Applications* (Academic Press, New York) (1967) pages 110–117, involved the local heating of an end of the preform which was affixed to the fiber, which was, in turn, drawn at a constant velocity of approximately 60 meters/min by winding on a 30 cm diameter mandrel rotating at 60 rpm.

The above description is in exemplary terms and is usefully read in conjunction with the appended examples. The inventive process departs from conventional CVD as described—i.e., in that reactant introduction rate and temperature are such as to result in homogeneous reaction to produce oxidic particles within the space enclosed, but separated from the walls of a tube. This, when combined with a moving hot zone, results in rapid preparation of a high quality preform as described. The moving hot zone is responsible for (1) homogeneous reaction; (2) to a large extent, the adherence of oxidic particles to the wall; and (3) fusion of the deposited particles and CVD-produced layer into a unitary, homogeneous glassy layer. In general, it is desirable to maintain the hot zone as short as possible depending upon constancy of traversal speed to result in uniform layer production. Motion of the hot zone should be such that every portion of the tube is heated to the zone temperature for the same period of time. This is easily accomplished by passing the heating means through a traversal distance which extends beyond the tube at both ends. Experimentally, hot zones of the order of 2 cm length (defining the heated region extending 4 cm on either side of the peak) have resulted in uniform coating under all experimental conditions. While, in principle, heating the entire tube may result in uniformity of deposition approaching that attained by use of a moving zone, very high flow rates are required to avoid inhomogeneity and differing thickness of deposit along the length of the tube.

4. Examples

The following examples, utilizing chloride or hydride reactants, are set forth. The selection was made with a view to demonstrating a wide variety of compositions and different types of optical waveguides preforms for which the procedure can be used.

The tube of commercial grade fused quartz was first cleaned by immersion in hydrofluoric acid-nitric acid solution for three minutes and was rinsed with deionized water for a period of one hour. Tubing was cut into 18" lengths, and such sections were utilized in each of the examples. The substrate tube was provided with appropriate input and exhaust sections, and was heated with a moving oxyhydrogen torch producing a hot zone which traversed the tube in from one to eight minutes. In each instance, flushing was by oxygen at a flow rate of between 100 and 500 $cm^3$/min corresponding with a linear rate of 4.5 meter/mins, and this flushing was continued for several traversals of the zone.

EXAMPLE 1

The fused quartz tube used in this example was 12 mm I.D. × 14 mm O.D. Initial deposition was of a cladding material, $SiO_2$-$B_2O_3$, by introduction of 41 $cm^3$/min. $SiCl_4$, 12.5 $cm^3$/min $BCl_3$, both carried by oxygen such that the total oxygen flow was 250 cc/min. Sixteen passes of the hot zone were made at a temperature of 1430 degrees C. Core material was next deposited by flows of 32 cc/min $SiCl_4$, 48 cc/min $GeCl_4$, and oxygen 650 cc/min. This was continued for 68 minutes and temperatures of the hot zone were maintained at 1460 degrees C. Remaining steps, including partial collapse with flowing gas and final collapse under no flow conditions, were as specified under Section 3. The fiber that resulted from this procedure had a core of approximately 40 $\mu m$ with an overall diameter of approximately 100 $\mu m$. Its length was 723 meters and optical attenuation was 2 dB/km at 1060–1100 nm.

EXAMPLE 2

A fused quartz tube 6 mm I.D. × 8 mm O.D. was cleaned as described and positioned in a glass lathe. Flows of diluted (1 percent by volume in $N_2$) silane, germane, diborane, and oxygen were passed through the tube as follows:

| | |
|---|---|
| $SiH_4$ | 1,000 cc/min. |
| $GeH_4$ | 150 cc/min. |
| $B_2H_6$ | 50 cc/min. |

Deposition commenced by heating the tube locally using an oxyhydrogen flame which was traversed along the length of the tube. The complete cycle took 3.7 minutes, and the highest temperature attained was 1400 degrees C. After 175 minutes, the gas flows were stopped and the tube collapsed in one additional pass, made at a much slower rate. Temperatures achieved here were in the vicinity of 1750-1900 degrees C. The preform was removed to a pulling apparatus and drawn to a fiber whose diameter was 100 microns overall. This consisted of a core whose composition was $SiO_2$-$GeO_2$-$B_2O_3$ of approximately 25 microns diameter. The cladding had the composition of $SiO_2$. The index difference produced by the core was 0.007.

EXAMPLE 3

A clean fused silica tube 6 mm I.D. × 8 mm O.D. was positioned in a glass lathe as previously described. Flows of diluted (3.05 percent by volume in $N_2$) silane, diborane, and oxygen were passed through the tube as follows:

| | |
|---|---|
| $SiH_4$ | 295 cc/min. |
| $B_2H_6$ | 49 cc/min. |
| $O_2$ | 900 cc/min. |

Deposition commenced by heating the tube locally using an oxyhydrogen torch which traversed along the tube at a rate of 0.10 cm/sec as the tube rotated at 100-120 rpm. The torch was adjusted so as to produce a temperature locally of 1375-1450 degrees C. When the torch had moved to the end of the tube, it was returned at 0.15 cm/sec with the $SiH_4$ and $B_2H_6$ flows stopped. This procedure continued for three hours. At this time the $B_2H_6$ flow was stopped and just $SiH_4$ and $O_2$ continued. At the same time, the torch was adjusted to produce temperatures of 1600-1650 degrees C., other conditions remaining the same as previously. Depositing the pure $SiO_2$ layer continued for 1.5 hours.

At this time, silane flow was stopped and just $O_2$ flow continued at 600 cc/min. Temperatures were varied during the next two passes to 1650-1700 degrees C. Now the oxygen was stopped, the traverse slowed to 0.05 cm/sec, and the temperature raised to 1850-1890 degrees C. to bring about complete collapse of the tube.

This procedure produced a preform having a core of pure $SiO_2$, a cladding layer of $B_2O_3$-$SiO_2$, and an outer jacket of commercial grade $SiO_2$. The fiber drawn from this preform had a core of 30 μm, cladding thickness of 15 μm and an outer jacket of 20 μm, with an index difference of 0.007 percent and losses of 3 dB/km at 1.06 μm wavelength.

EXAMPLE 4

For optical communications employing multimode optical fibers it is desirable to more nearly equalize the group velocities of propagating modes. This result is expected if the index of the core is gradually increased from the cladding toward the interior of the core. To accomplish this a 8 mm I.D. × 10 mm O.D. fused quartz tube was positioned and borosilicate layer intended to serve as a portion of the cladding and as a barrier layer was deposited as in Example 1. Next deposition of the $GeO_2$-$B_2O_3$-$SiO_2$ core was commenced except that the germania content was gradually increased from zero during the period of deposition. The conditions used during the deposition were as follows:

Barrier layer

| | | |
|---|---|---|
| $SiCl_4$ | 32 | cc/min |
| $BCl_3$ | 12.5 | cc/min |
| $O_2$ | 250 | cc/min |
| Temp | 1740 | degrees C. |
| Time | 25 | min. |

Graded Index portion of the core

| | |
|---|---|
| $SiCl_4$ | 33 cc/min |
| $BCl_3$ | 12.5  7.5 cc/min |
| | 17 equal increments at 2 min intervals |
| $GeCl_4$ | 0-35 cc/min |
| | 17 equal increments at 2 min intervals |
| $O_2$ | 460-830 cc/min |
| | 17 equal increments at 2 min intervals |
| Temp | 1470 degrees C. |

Constant Index portion of core

| | | |
|---|---|---|
| $SiCl_4$ | 32 | cc/min |
| $BCl_3$ | 7.5 | cc/min |
| $GeCl_4$ | 35 | cc/min |
| $O_2$ | 830 | cc/min |
| Temp | 1470 | degrees C. |
| Time | 53 | min. |

At the conclusion of the deposition, the tube was collapsed to yield a solid preform which was then pulled to yield an optical fiber. When the mode dispersion of this fiber was measured, it behaved in a manner expected of a graded index. This behavior can be expressed by relation (Bell System Technical Journal 52, pp. 1566 (1973)) $\eta = \eta_0[1-2\Delta(r/a)^\alpha]^{\frac{1}{2}}$ where in this instance the value of $\alpha = 5$.

What is claimed is:

1. Process for fabrication of a glass fiber optical transmission line, comprising a core section and a cladding, wherein the cladding has an index of refraction of a value lower than the maximum index of the core for energy of the wavelength to be transmitted, comprising introducing a moving stream of a vapor mixture including at least one compound glass-forming precursor together with an oxidizing medium into a tube while heating the tube so as to react the said mixture and produce a glassy deposit on the inner surface of the tube, characterized in that heating of tube and contents are by a moving hot zone produced by a correspondingly moving heat source external to the tube in that combustion within the tube is avoided and in that temperature within the hot zone, composition of the vapor mixture, and rate of introduction of the vapor mixture are maintained at values such that at least a part of the reaction takes place within the gaseous mixture at a position spaced from the inner walls of the said tube, thereby producing a suspension of oxidic reaction product particulate material, whereby the particulate material while traveling downstream comes to rest on the inner surface of the tube within a region which extends from a position within the said hot zone, the moving zone serving the dual functions of: nucleation site for homogeneous reaction to produce particulate matter; and consolidation site for previously produced particulate matter.

2. Process of claim 1 in which the vapor mixture includes a silicon-bearing compound as a glass compound precursor.

3. Process of claim 2 in which said oxidizing medium is oxygen.

4. Process of claim 3 in which the highest temperature within the hot zone during traversal is at least 1200 degrees C.

5. Process of claim 1 in which the tube is rotated during processing.

6. Process of claim 1 in which the tube is disposed essentially horizontally during processing and in which the tube is rotated axially at a rate of at least 100 rpm.

7. Process of claim 1 in which the tube is disposed essentially vertically.

8. Process of claim 1 in which the composition of glass precursor is varied at least once during processing.

9. Process of claim 8 in which the variation in composition of the glass precursor is such as to result in index of refraction which increases with successive depositions.

10. Process of claim 9 in which the composition of the initial glass deposit is primarily silica.

11. Process of claim 10 in which the initial deposit includes boron oxide.

12. Process of claim 9 in which the composition of the glassy deposit is varied so as to result in at least a region of increasing refractive index in a radial direction toward the center.

13. Process of claim 1 in which the said mixture includes chlorides of the cations to be included in the glassy deposit.

14. Process of claim 1 in which the said mixture includes hydrides of the cations to be included in the glassy deposit and in which the said mixture includes an inert gaseous diluent.

15. Process of claim 1 in which the hot zone temperature is increased after initial processing so as to result in at least partial collapse of the said tube.

16. Process of claim 15 in which the increase in temperature is produced by decreasing the rate of traversal of the said hot zone.

17. Process of claim 15 in which the temperature is ultimately increased to a level sufficient to result in complete collapse of the tube and deposit, thereby producing a solid preform structure.

18. Process of claim 17 in which the said preform structure is drawn to produce a fiber.

19. Process of claim 18 in which drawing is sufficient to produce an ultimate outer diameter of the order of 100 $\mu$m.

20. Process of claim 19 in which the tube is retained as a portion of the said preform so that a reduced version of the core is retained in the final fiber.

21. Process of claim 19 in which the fiber cross-section portion corresponding with glassy material deposited during the said method has a diameter of at least 30 $\mu$m.

22. Process of claim 1 in which the said tube with glassy deposit is drawn to produce the said line.

23. Process of claim 22 in which the said tube with deposit is at least partially collapsed prior to drawing.

24. Process of claim 1 in which the said vapor mixture includes a hydride and also includes diluent to avoid combustion.

25. Article produced in accordance with the process of claim 1.

26. A process of fabricating a preform for drawing into a glass fiber optical transmission line comprising introducing into a rotating glass tube, the inner surface of which is made up of a glass having a first refractive index, a gaseous mixture of oxygen and chlorides of silicon and germanium while a hot zone moving repeatedly along said tube is produced inside said tube by a heat source external to said tube, while maintaining the temperature of the hot zone sufficiently high and introducing said silicon and germanium chlorides at a sufficient rate that the silicon and germanium are converted to an oxidic product at least partly in the form of entrained particulate material which comes to rest on the inner surface of the tube, the said temperature being sufficiently high to effect fusion of said deposited particulate material into a unitary glassy layer of a refractive index higher than said first refractive index.

* * * * *

REEXAMINATION CERTIFICATE (528th)

United States Patent [19]

MacChesney et al.

[11] B1 4,217,027

[45] Certificate Issued  Jul. 15, 1986

[54] OPTICAL FIBER FABRICATION AND RESULTING PRODUCT

[75] Inventors: John B. MacChesney, Stirling; Paul B. O'Connor, Plainfield, both of N.J.

[73] Assignee: Bell Telephone Laboratories, Incorporated, Murray Hill, N.J.

Reexamination Request:
No. 90/000,810, Jul. 2, 1985

Reexamination Certificate for:
Patent No.: 4,217,027
Issued: Aug. 12, 1980
Appl. No.: 828,617
Filed: Aug. 29, 1977

Related U.S. Application Data

[63] Continuation of Ser. No. 444,705, Feb. 22, 1974, abandoned.

[51] Int. Cl.$^4$ ............................................. G02B 6/16
[52] U.S. Cl. ................................... 350/96.3; 65/3.12; 65/18.2

[56] References Cited

U.S. PATENT DOCUMENTS

| | | | |
|---|---|---|---|
| 3,711,262 | 1/1973 | Keck et al. | 65/3.12 |
| 3,737,292 | 6/1973 | Keck et al. | 65/3.12 |
| 3,737,293 | 6/1972 | Maurer | 65/3.12 |
| 3,778,132 | 12/1973 | Pinnow et al. | 350/96 |
| 3,806,224 | 4/1974 | MacChesney et al. | 350/96 |
| 3,823,995 | 7/1974 | Carpenter | 350/96.31 |
| 3,826,560 | 7/1974 | Schultz | 350/96.31 |
| 3,843,229 | 10/1974 | Rosenberger | 350/96.31 |
| 3,853,384 | 12/1974 | Pinnow et al. | 350/96 |
| 3,884,550 | 5/1975 | Maurer | 65/3.12 X |
| 3,961,926 | 6/1976 | Asam | 65/3.12 |
| 3,963,468 | 6/1976 | Jaeger et al. | 65/3 |
| 4,263,032 | 4/1981 | Sinclair et al. | 65/3.12 |
| 4,302,230 | 11/1981 | MacChesney et al. | 65/3.12 |

FOREIGN PATENT DOCUMENTS

2328930  1/1974  Fed. Rep. of Germany.

OTHER PUBLICATIONS

Powell et al., "Vapor Disposition" Textbook, Published by John Wiley & Sons, 1966, pp. 391-397.
Kern et al., "Chemical Vapor Deposition of Silicate Glasses . . . "; J. Electrochem. Soc., vol. 117, pp. 562-568; Apr. 1970.
French et al., Abstract F2, Conference Program–Preparation and Properties of Electronic Materials, Sponsored by Electronic Materials Committee of the Metallurgical Society of AIME, 1973.
Hass et al., Physics of Thin Films, pp. 238 and 286-289, Academic Press, 1969.
Powell et al., "Vapor Deposition" Textbook, pp. 549-578, Published by John Wiley & Sons, 1966.
French et al., "Low-Loss Fused Silica Optical Waveguide With Borosilicate Cladding", App. Phys. Lett., vol. 23, No. 6, 9/15/73.
MacChesney et al., "Low-Loss Silica Core-Borosilicate Clad Fiber Optical Waveguide", App. Phys. Lett., vol. 23, No. 6, 9/15/73.
Powell et al., "Vapor Deposition" Textbook, pp. 10-13, 149-153, 258-263, Published by John Wiley & Sons, 1966.

*Primary Examiner*—Kenneth M. Schor

[57] ABSTRACT

A preform for fabrication of a glass fiber optical transmission line is prepared by chemical reaction of vapor ingredients within a glass tube. Reaction, which may be between chlorides or hydrides of, for example, silicon and germanium with oxygen, occurs preferentially within a constantly traversing hot zone. Flow rates and temperature are sufficient to result in glass formation in the form of particulate matter on the inner surface of the tube. This particular matter deposits on the tube and is fused with each passage of the hot zone. Continuous rotation of the tube during processing permits attainment of higher temperatures within the heated zone without distortion of the tube.

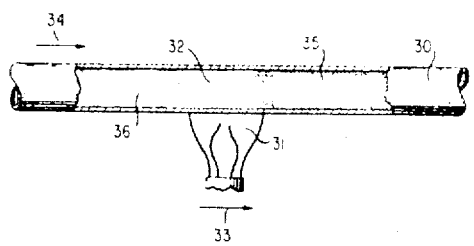

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 26 are determined to be patentable as amended.

Claims 2-25, dependent on an amended claim, are determined to be patentable.

1. Process for fabrication of a glass fiber optical transmission line, comprising a core section and a cladding, wherein the cladding has an index of refraction of a value lower than the maximum index of the core for energy of the wavelength to be transmitted, comprising introducing a moving stream of a vapor mixture including at least one compound glass-forming precursor together with an oxidizing medium into a tube while heating the tube so as to react the said mixture and produce a glassy deposit on the inner surface of the tube, characterized in that heating of tube and contents are by a moving hot zone produced by a correspondingly moving heat source external to the tube in that combustion within the tube is avoided and in that temperature within the hot zone, composition of the vapor mixture, and rate of introduction of the vapor mixture are maintained at values such that at least a part of the reaction takes place within the gaseous mixture at a position spaced from the inner walls of the said tube, thereby producing a *visible* suspension of oxidic reaction product particulate material, whereby the particulate material while traveling downstream comes to rest on the inner surface of the tube within a region which extends from a position within the said hot zone, the moving zone serving the dual functions of: nucleation site for homogeneous reaction to produce particulate matter; and consolidation site for previously produced particulate matter.

26. A process of fabricating a preform for drawing into a glass fiber optical transmission line comprising introducing into a rotating glass tube, the inner surface of which is made up of a glass having a first refractive index, a gaseous mixture of oxygen and chlorides of silicon and germanium while a hot zone moving repeatedly along said tube is produced inside said tube by a heat source external to said tube, while maintaining the temperature of the hot zone sufficiently high and introducing said silicon and germanium chlorides at a sufficient rate that the silicon and germanium are converted at *least in part by homogeneous reaction* to *result in* an oxidic product at least partly in the form of *visible* entrained particulate material which comes to rest on the inner surface of the tube, the said temperature being sufficiently high to effect fusion of said deposited particulate material into a unitary glassy layer of a refractive index higher than said first refractive index.

* * * * *